United States Patent [19]
Lang et al.

[11] Patent Number: 4,601,192
[45] Date of Patent: Jul. 22, 1986

[54] METHOD OF PRODUCING AN EXPANSION SLEEVE FOR A METALLIC EXPANSION DOWEL ASSEMBLY

[75] Inventors: Gusztav Lang; Erich Leibhard, both of Munich; Peter Froehlich, Neuried, all of Fed. Rep. of Germany

[73] Assignee: Hilti Aktiengesellschaft, Furstentum, Liechtenstein

[21] Appl. No.: 689,666

[22] Filed: Jan. 8, 1985

[30] Foreign Application Priority Data

Jan. 9, 1984 [DE] Fed. Rep. of Germany ....... 3400475

[51] Int. Cl.⁴ .................. B21D 31/00; B21K 1/76
[52] U.S. Cl. ........................... 72/377; 10/27 PH
[58] Field of Search ............ 10/11 R, 27 R, 27 E, 10/27 FS, 27 PH, 86 R, 86 A, 86 F; 72/377; 403/297; 411/75–80

[56] References Cited

U.S. PATENT DOCUMENTS 3,117,483  1/1964  Brown .................. 411/76
3,296,764  1/1967  Tremblay ............. 411/79 X
4,464,076  8/1984  Leibhard .............. 403/297
4,520,521  6/1985  Miyake ............... 10/27 PH

FOREIGN PATENT DOCUMENTS 15308    of 1929  Australia ............. 10/27 PH
1072866  1/1960   Fed. Rep. of Germany ... 10/27 PH
1243687  9/1960   France .............. 10/27 PH Primary Examiner—E. Michael Combs
Attorney, Agent, or Firm—Toren, McGeady, Stanger, Goldberg & Kiel

[57] ABSTRACT

An axially elongated expansion sleeve is formed from an extruded cylindrically shaped blank with a blind hole in one end. An axially extending part of the blank from the other end is deformed into a U-shaped section of uniform thickness. The U-shaped section is upset so that it increases in thickness toward the other end. The upset U-shaped section is shaped to provide it with a cylindrically shaped outside surface with the inside base of the section sloping toward the axis of the sleeve in the direction toward the other end.

5 Claims, 6 Drawing Figures

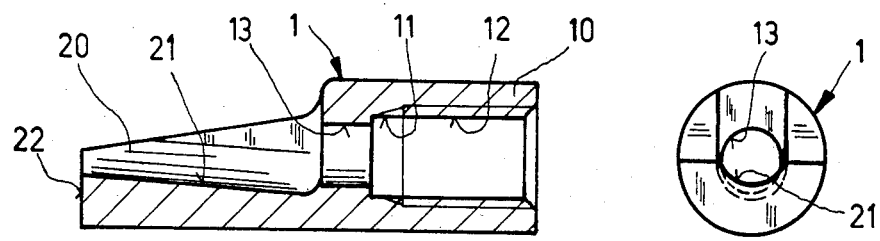
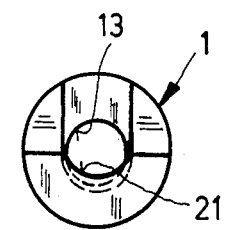
Fig. 1  Fig. 2
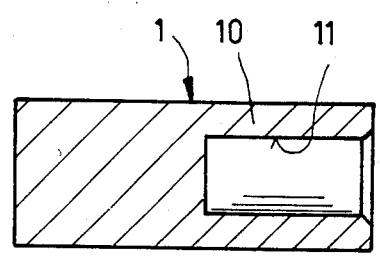
Fig. 3
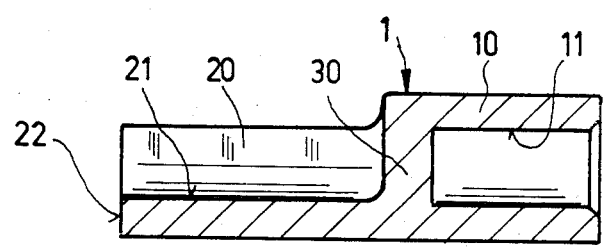
Fig. 4
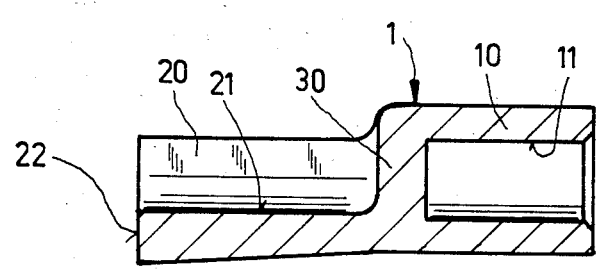
Fig. 5
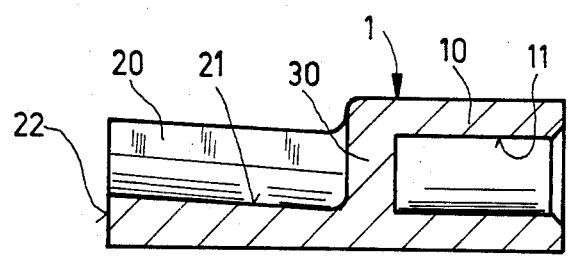
Fig. 6

METHOD OF PRODUCING AN EXPANSION SLEEVE FOR A METALLIC EXPANSION DOWEL ASSEMBLY

BACKGROUND OF THE INVENTION

The present invention is directed to a method of producing a metallic expansion sleeve for expansion dowel assemblies where the sleeve has a hollow, cylindrically shaped receiving section and an expansion section with a substantially U-shaped transverse cross-section formed with a bight or base part converging inwardly toward the axis of the sleeve in the leading end direction, that is, the end first inserted into a borehole in which the dowel assembly is to be anchored.

Expansion dowel assemblies of the above type have been particularly successful in establishing high pull-out values and in affording favorable after-expansion behavior. Since such dowel assemblies are not constructed rotationally symmetrical, they are costly to manufacture by machining operations. Accordingly, such dowel assemblies have experienced only limited use in the past because of costs though they embody technical advantages.

SUMMARY OF THE INVENTION

Therefore, the primary object of the present invention is to provide a method for the simple and economical production of an expansion sleeve for use in expansion dowel assemblies of the above type. In accordance with the present invention, the expansion section is formed in an extrusion molding operation where, initially, an elongated portion of a blank is provided with a U-shaped cross-section with the section having a uniform thickness. Subsequently, the bight or base portion of the U-shaped section is increased in thickness toward the leading end of the expansion sleeve. Finally, the outside surface of the U-shaped section is shaped cylindrically so that the thickness of the base or bight increases toward the leading end of the expansion sleeve.

According to the method embodying the present invention, the complete expansion section of the dowel assembly can be produced in only three working operations without any machining. The extrusion molding operation is especially practical for mass production and results in substantially higher strength values as compared to machined expansion sleeves. This advantage is achieved because the structure of the material forming the blank from which the expansion sleeve is formed is not interrupted in the extrusion operation, rather it is only reshaped.

The production of the expansion sleeve can be started from several different shaped members. It is preferable to use a blank containing a blind borehole in the part forming the receiving section with the blank being formed in an extrusion operation with a female screw thread formed in the blind borehole. The formation of a blind borehole in an extrusion operation is much simpler and more practical than in a machining operation, particularly where large quantities are being produced. Moreover, because of the greater strength of extruded members, it is possible to use smaller thicknesses than in machining operations.

In the production of the expansion sleeve, the receiving section and the expansion section are formed substantially independently of one another. An expansion member forms a part of the dowel assembly and is constructed substantially complementary to the shape of the expansion sleeve. When the expansion sleeve is being fixed in a borehole, the expansion member must be axially displaceable relative to the sleeve so that the sleeve can be expanded. To facilitate the expansion or spreading step, it is preferable to form an opening extending between the base of the blind borehole and the U-shaped expansion section. This opening can be produced after completing the formation of the U-shaped expansion section. The opening permits the insertion of an arbor-shaped work tool from the blind borehole into the expansion section. The base of the blind borehole can be opened by a punching or drilling operation so that the formation of the opening has no significant effect on the strength of the expansion sleeve.

The expansion sleeve for an expansion dowel assembly, formed in accordance with the method of the present invention, preferably has a hollow cylindrically shaped receiving section with a female thread within the hollow part of the section, and an expansion section with a substantially U-shaped cross-section with the thickness of the bight or base of the U-shaped section increasing in the direction from the receiving section toward the opposite end of the sleeve, that is, toward the leading end of the sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of a completed expansion sleeve;

FIG. 2 is front end view of the expansion sleeve illustrated in FIG. 1;

FIG. 3 is an axially extending sectional view of a blank used in producing the expansion sleeve;

FIG. 4 is an axially extending sectional view of the expansion sleeve after the formation of the U-shaped expansion section;

FIG. 5 is an axially extending sectional view of the expansion sleeve after the expansion section has been upset; and FIG. 6 is an axially extending sectional view of the expansion sleeve after the expansion section has been provided with a cylindrical shape.

DETAILED DESCRIPTION OF THE INVENTION

In FIGS. 1 and 2 an axially elongated expansion sleeve 1 is shown with the leading end of the sleeve located on the left in FIG. 1 and the trailing end at the right. The sleeve is formed in the axial direction, starting from the trailing end, of a receiving section 10 with an expansion section 20 extending from the leading end of the receiving section to the leading end of the sleeve. Initially, the receiving section is formed with a blind borehole 11 extending for a substantial portion of the axial length and a female thread is formed in the blind borehole. For access between the borehole 11 and the expansion section 20, a hole or opening 13 is provided connecting the base of the borehole and the expansion section 20. In the front end view of the sleeve 20, that is, the leading end, it can be noted that the expansion section 20 has a U-shaped cross-section. The U-shaped cross-section includes a bight base 21 with a pair of legs extending upwardly from the base. As can be seen in FIG. 1 the inside surface of the base slopes upwardly toward the axis of the sleeve to the leading end 22. Due to the cylindrical shape provided on the outside surface of the expansion section 20, the thickness of the bight base 21 increases from the transition between the receiving section and the expansion section to the leading end 22 of the expansion sleeve 1.

FIGS. 3 to 6 display the various steps in the deformation of the expansion section 20 in the production of the expansion sleeve 1.

In FIG. 3 a blank for forming the expansion sleeve is shown with a blind borehole 11 formed in the receiving section 10. At the outset, the blank is rotationally symmetrical and can be produced in an extrusion operation.

In FIG. 4 the leading end part of the blank 20 is deformed to provide a substantially U-shaped cross-section for the expansion section 20. Note the expansion section 20 is spaced from the base of the borehole 11 in the receiving section. The formation of the U-shaped cross-section of the expansion section 20 can be effected in an extrusion operation. A wall or partition 30 remains between the base of the blind borehole 11 and the trailing end of the expansion section 20. At this point in the formation of the expansion section, the inside surface of the bight or base 21 of the U-shaped cross-section is parallel to the axis of the expansion sleeve. Further, the base 21 has a uniform thickness along its axial length.

In FIG. 5 the expansion section 20 is axially upset commencing at the leading end 22. As a result, the base 21 of the expansion section has its maximum thickness at the leading end 22 and the base thickness decreases to the transition with the receiving section 10. Due to this upsetting operation, the radially outer surface of the U-shaped expansion section is no longer cylindrical.

In the final step of shaping the expansion sleeve, as shown in FIG. 6, the radially outer surface of the expansion sleeve is provided with a cylindrical shape. In other words, the outside surface of the sleeve is calibrated or gauged providing the expansion section with a cylindrical shape. Due to this operation, the inside surface of the base 21 of the expansion section 20 does not extend parallel with the expansion sleeve axis, as shown in FIG. 5, instead the inside surface of the base slopes upwardly toward the axis to the leading end of the sleeve. As can be seen in FIG. 6, the wall thickness of the base 21 of the expansion section 20 increases in the direction toward the leading end of the sleeve. At this stage in the formation of the expansion sleeve, a wall 30 is still present between the base of the blind borehole 11 and the trailing end of the U-shaped expansion section 20. The wall 30 can be pierced in a subsequent step to provide the opening 13 as shown in FIG. 1.

While specific embodiments of the invention have been shown and described in detail to illustrate the application of the inventive principles, it will be understood that the invention may be embodied otherwise without departing from such principles.

We claim:

1. Method of producing an axially elongated expansion sleeve for an expansion dowel assembly with the completed expansion sleeve having a first end and a second end spaced apart in the axial direction, said expansion sleeve comprising a cylindrically shaped axially extending receiving section extending from the first end toward the second end and having an axially extending bore extending from the first end, and an axially extending expansion section extending from the second end toward the first end and said expansion section being substantially U-shaped in cross-section transverse to the axial direction, said U-shaped section having a bight base and a pair of legs extending from said bight base, said base has a radially inner surface facing toward and spaced from the axis of said expansion sleeve and an oppositely facing radially outer surface spaced more remotely from the axis of said expansion sleeve than said radially inner surface, and said radially inner surface converges inwardly toward the axis in the direction extending toward the second end, comprising the steps of forming an axially extending rotationally symmetrical blank for forming the expansion sleeve with the blank having a first end and a second end corresponding to the expansion sleeve, deforming at least an axially extending part of the axially extending blank from the second end toward the first end into a U-shaped section extending from the second end toward and spaced from the first end with the U-shaped section having a uniform base thickness, upsetting the U-shaped section to increase the thickness of the base of the U-shaped section so that the thickness increases in the direction toward the second end, shaping the upset U-shaped section so that the radially outer surface thereof is cylindrically shaped for the extent thereof in the axial direction of the expansion sleeve and with the radially inner surface of said base converging toward the expansion sleeve axis in the direction toward the second end.

2. Method, as set forth in claim 1, wherein forming the expansion sleeve from a metal blank.

3. Method, as set forth in claim 1, wherein extruding the blank used for forming the expansion sleeve and forming a blind borehole in the receiving section of the sleeve in the extrusion step.

4. Method, as set forth in claim 3, including the step of forming a female screw thread in the axially extending surface of the blind borehole.

5. Method, as set forth in claim 3, including forming the blind borehole in the receiving section so that a wall remains between the base of the blind borehole and the adjacent end of the U-shaped expansion section, and forming an opening between the base of the blind borehole and the U-shaped expansion section.

* * * * *